(12) United States Patent
Russell et al.

(10) Patent No.: US 11,116,131 B2
(45) Date of Patent: Sep. 14, 2021

(54) VEGETATION CUTTING APPARATUSES

(71) Applicants:Zachariah D. Russell, Dubach, LA (US); Kevin S. Holly, Ruston, LA (US)

(72) Inventors: Zachariah D. Russell, Dubach, LA (US); Kevin S. Holly, Ruston, LA (US)

(73) Assignee: Path-Maker LLC, Dubach, LA (US)

( * ) Notice: Subject to any disclaimer, the term of this patent is extended or adjusted under 35 U.S.C. 154(b) by 294 days.

(21) Appl. No.: 16/444,744

(22) Filed: Jun. 18, 2019

(65) Prior Publication Data
US 2019/0373813 A1 Dec. 12, 2019

(51) Int. Cl.
*A01D 34/83* (2006.01)
*A01D 34/67* (2006.01)
*A01D 34/835* (2006.01)

(52) U.S. Cl.
CPC .......... *A01D 34/833* (2013.01); *A01D 34/67* (2013.01); *A01D 34/831* (2013.01); *A01D 34/835* (2013.01)

(58) Field of Classification Search
CPC .. A01D 34/833; A01D 34/831; A01D 34/835; A01D 34/67
See application file for complete search history.

(56) References Cited

U.S. PATENT DOCUMENTS

| 396,038 A | 1/1889 | Hall | |
| 1,851,840 A * | 3/1932 | Huff | A01D 34/833 56/292 |
| 2,711,761 A * | 6/1955 | Grants | B23D 53/12 30/380 |
| 2,728,181 A * | 12/1955 | Carpenter | A01D 34/831 56/12.7 |
| 2,957,294 A * | 10/1960 | Hallenbeck | A01D 34/833 56/15.4 |
| 3,006,126 A * | 10/1961 | Viverette | A01D 34/833 56/13.3 |
| 3,488,931 A * | 1/1970 | Matthews | A01D 34/833 56/12.7 |
| 3,641,752 A * | 2/1972 | Ipbach | A01D 34/83 56/291 |
| 4,164,835 A * | 8/1979 | Conte | A01D 34/83 30/381 |
| 4,267,686 A * | 5/1981 | Heath | A01D 34/83 30/347 |
| 4,418,519 A * | 12/1983 | Fralish | A01D 34/83 56/244 |
| 4,738,084 A | 4/1988 | Ogano et al. | |
| 2014/0260153 A1* | 9/2014 | Blank | A01D 34/831 56/14.7 |
| 2019/0373811 A1* | 12/2019 | Hagg | A01D 34/831 |

* cited by examiner

*Primary Examiner* — Abigail A Risic
(74) *Attorney, Agent, or Firm* — R. Keith Harrison

(57) ABSTRACT

Vegetation cutting apparatuses may include a wheeled apparatus frame. A cutting assembly may be carried by the wheeled apparatus frame. The cutting assembly may include an elongated chain support member having a chain support member edge. An elongated debris removal slot may extend into the chain support member from the chain support member edge. A cutting chain may be configured to traverse the chain support member edge of the chain support member. An engine may drivingly engage the cutting chain.

20 Claims, 12 Drawing Sheets

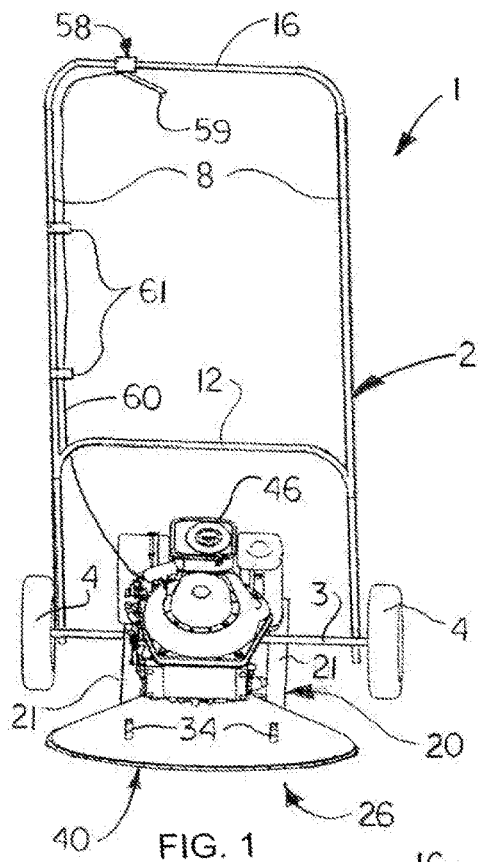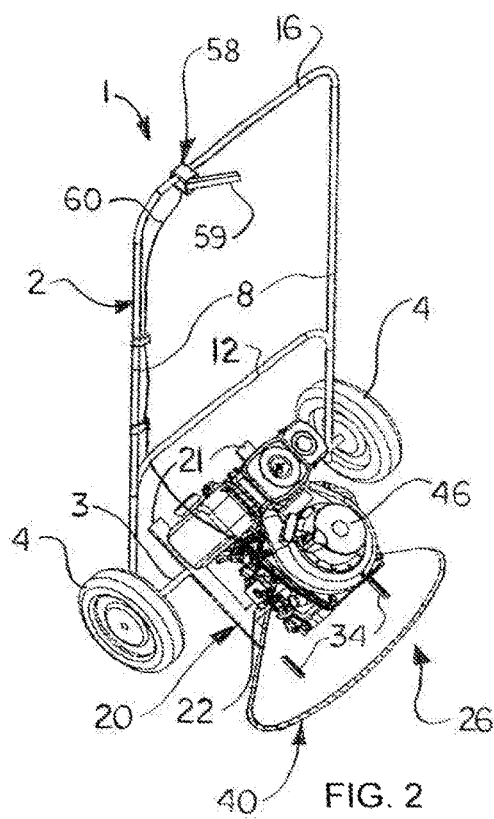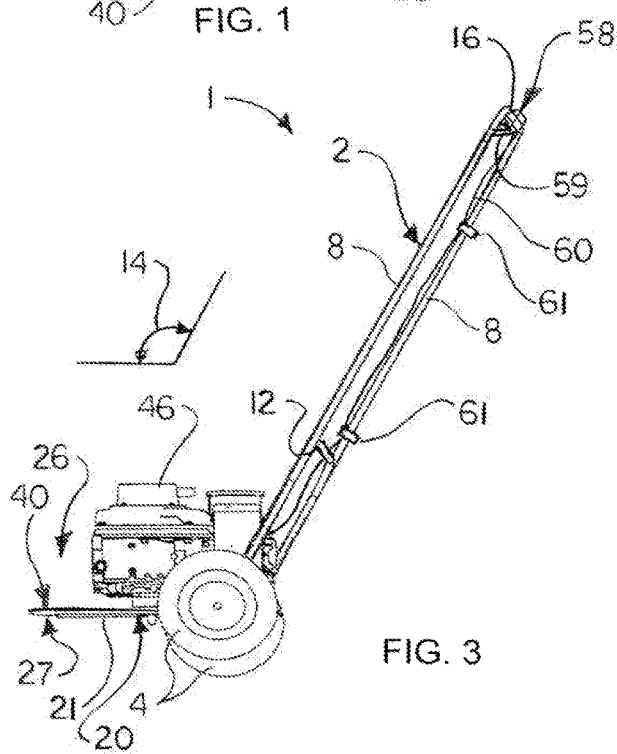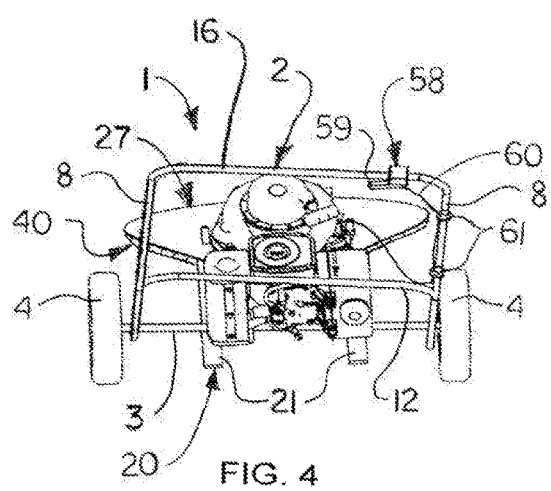

VEGETATION CUTTING APPARATUSES

FIELD

Illustrative embodiments of the disclosure generally relate to apparatuses for cutting trees and other vegetation. More particularly, illustrative embodiments of the disclosure relate to vegetation cutting apparatuses which are suitable for cutting vegetation in narrow clearances between closely-adjacent obstacles such as trees, for example.

SUMMARY

Illustrative embodiments of the disclosure are generally directed to vegetation cutting apparatuses suitable for cutting vegetation in narrow clearances between closely-adjacent obstacles such as trees, rocks or poles. An illustrative embodiment of the vegetation cutting apparatuses may include a wheeled apparatus frame. A cutting assembly may be carried by the wheeled apparatus frame. The cutting assembly may include an elongated chain support member having a chain support member edge. An elongated debris removal slot may extend into the chain support member from the chain support member edge. A cutting chain may be configured to traverse the chain support member edge of the chain support member. An engine may drivingly engage the cutting chain.

BRIEF DESCRIPTION OF THE DRAWINGS

Illustrative embodiments of the disclosure will now be described, by way of example, with reference to the accompanying drawings, in which:

FIG. 1 is a top front perspective view of an illustrative embodiment of the vegetation cutting apparatuses;

FIG. 2 is a top side perspective view of the illustrative vegetation cutting apparatus;

FIG. 3 is a side perspective view of the illustrative vegetation cutting apparatus;

FIG. 4 is a top rear perspective view of the illustrative vegetation cutting apparatus;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 9:
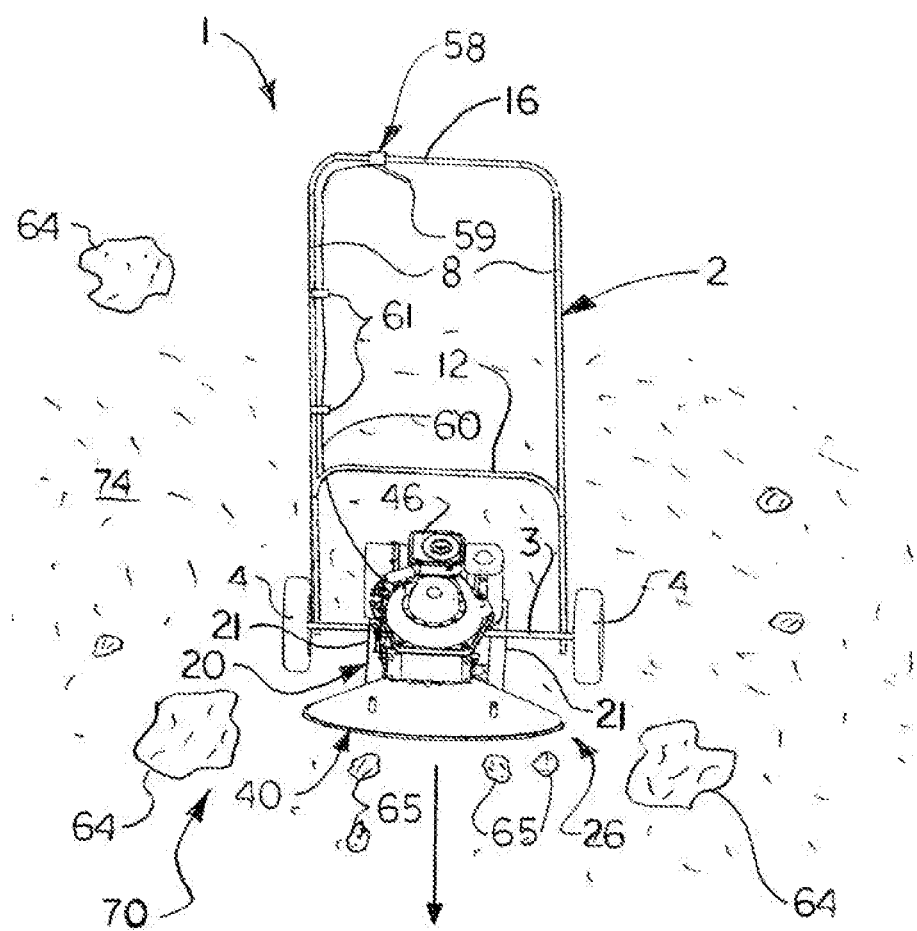
FIG. 9 is a top front perspective view of the illustrative vegetation cutting apparatus, more particularly illustrating cutting of vegetation in a narrow clearance between closely-adjacent obstacles in typical application of the vegetation cutting apparatus.
Figure 10:
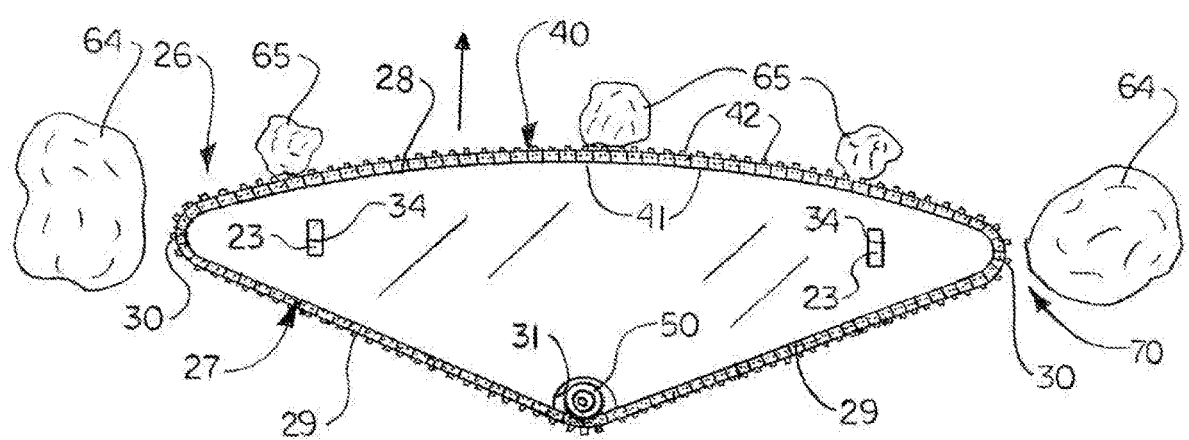
FIG. 10 is a top view of the cutting assembly of the vegetation cutting apparatus as the cutting chain contacts the vegetation in the clearance between the obstacles.
Figure 11:
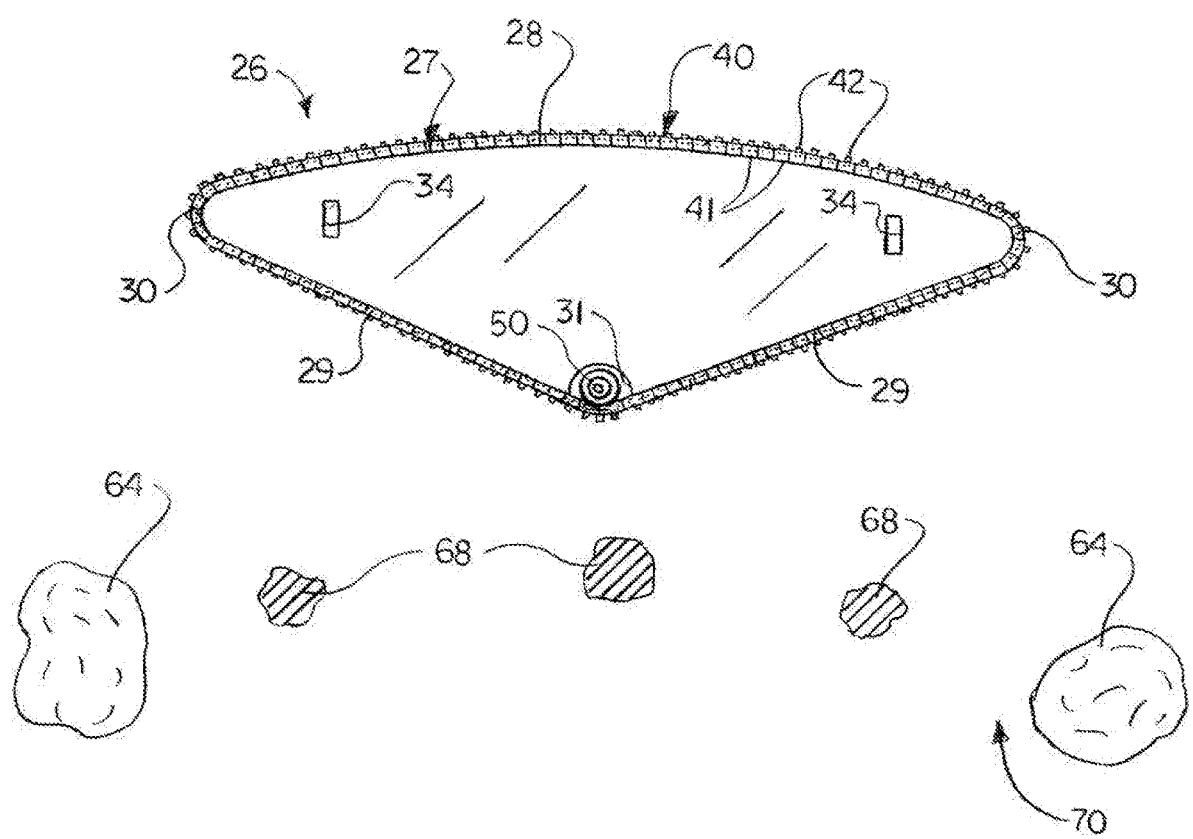
FIG. 11 is a top view of the cutting assembly after the vegetation (shown in cross-section) has been cut.
Figure 12:
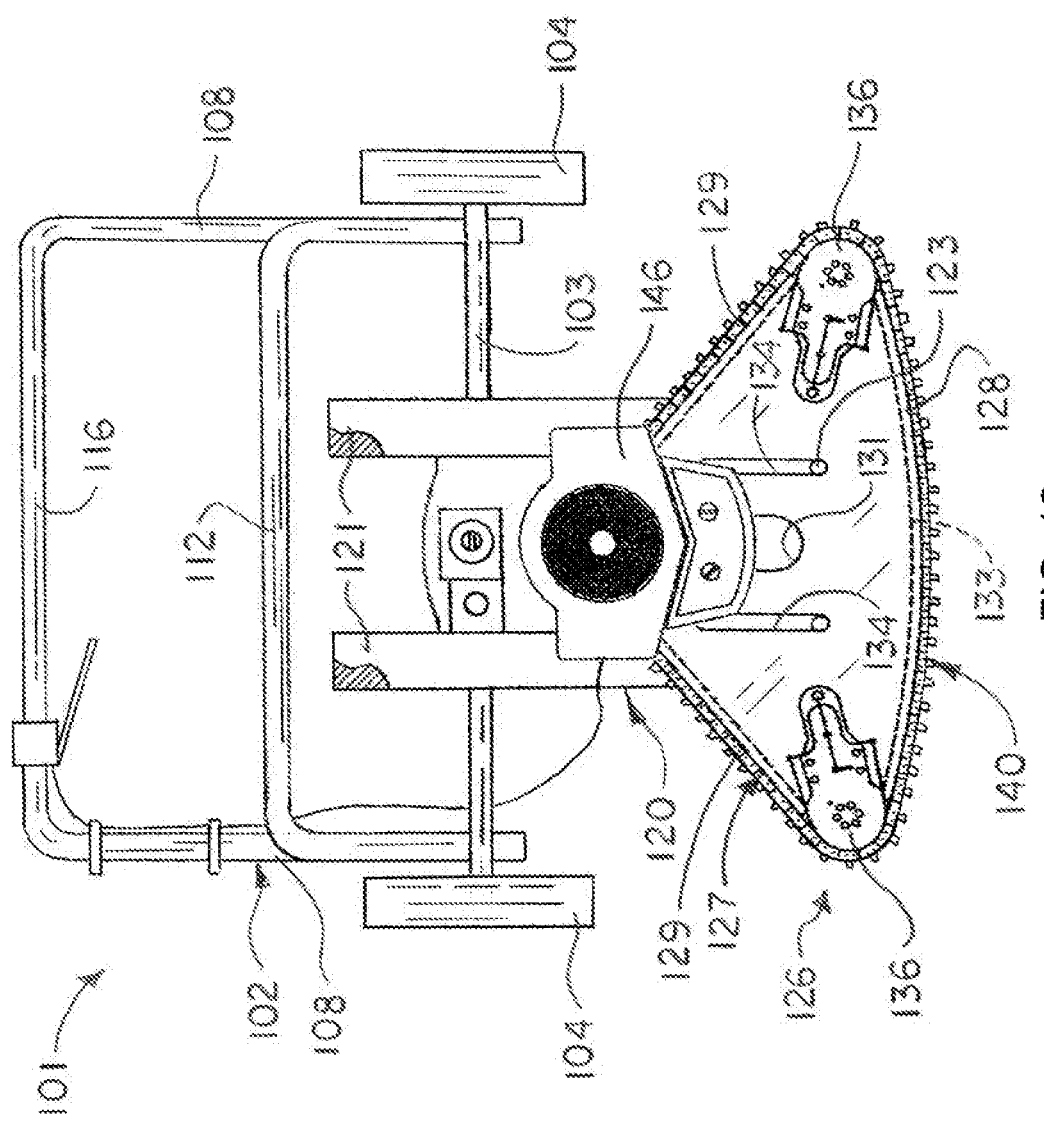
FIG. 12 is a top view of an alternative illustrative embodiment of the vegetation cutting apparatuses.

Referring initially to FIGS. 9-11 of the drawings, an illustrative embodiment of the vegetation cutting apparatuses is generally indicated by reference numeral 1. As will be hereinafter described, the vegetation cutting apparatus 1 may be suitably configured for cutting vegetation 65 which grows in a narrow clearance 70 between closely-adjacent obstacles 64 such as rocks, trees, or poles, for example and without limitation. The vegetation 65 may include small trees or thick brush, for example. Accordingly, the vegetation cutting apparatus 1 may enable cutting of vegetation 65 which may be otherwise inaccessible to chainsaws and other conventional vegetation cutting apparatuses.

Figure 5:
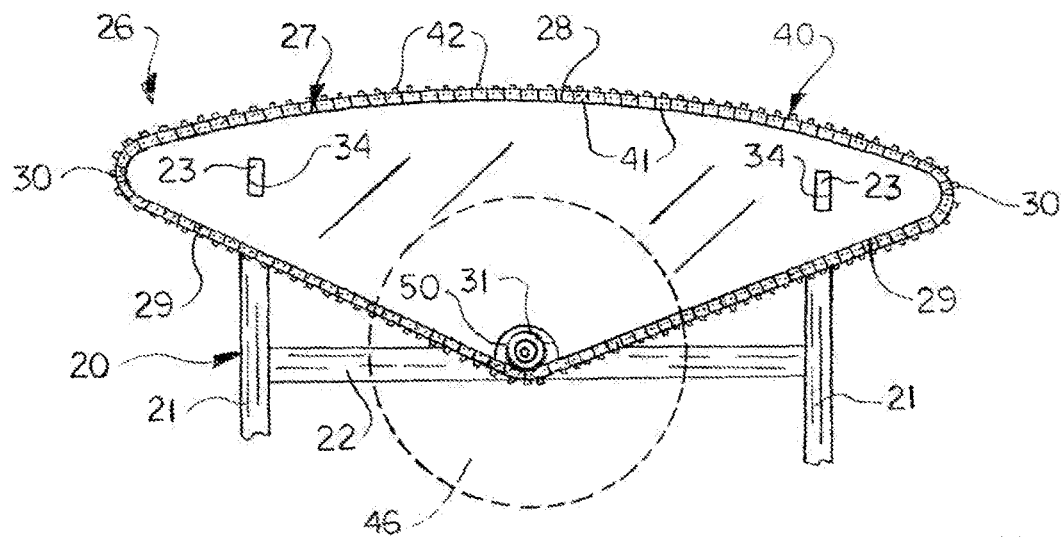
FIG. 5 is a top view of a typical cutting assembly of the illustrative vegetation cutting apparatus, mounted on a typical base frame portion of the apparatus frame.
Figure 6:
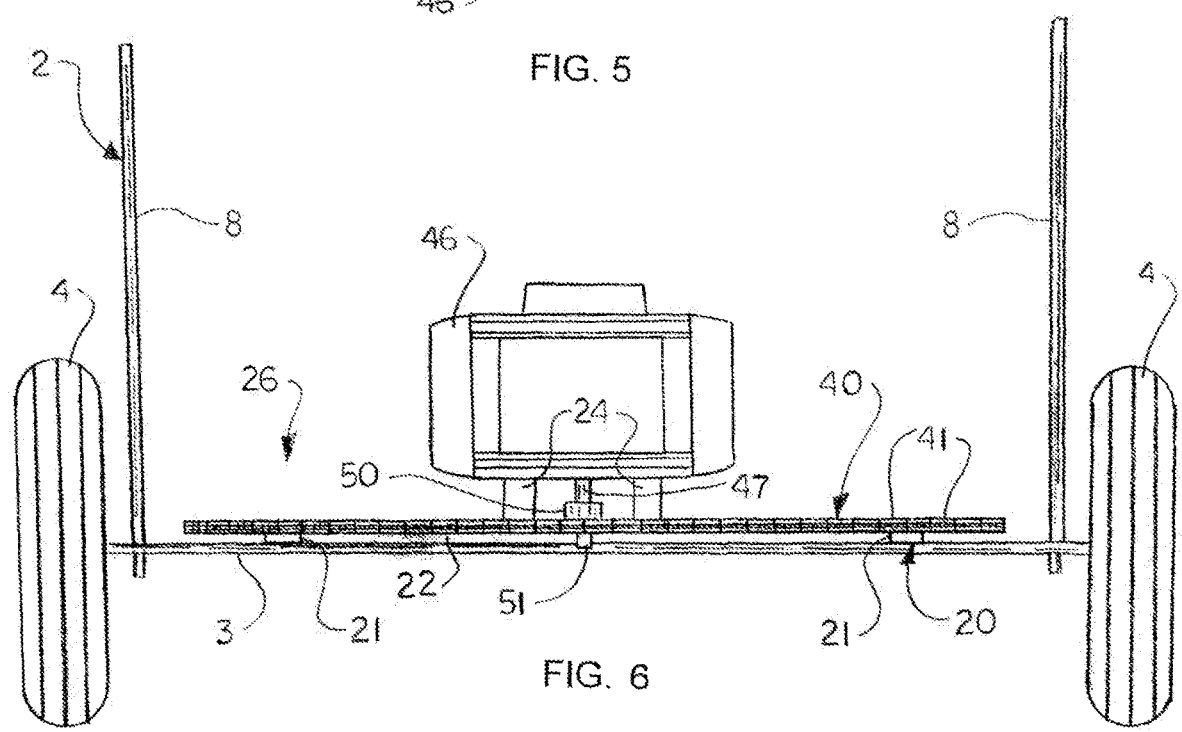
FIG. 6 is a rear view of the cutting assembly.
Figure 7:
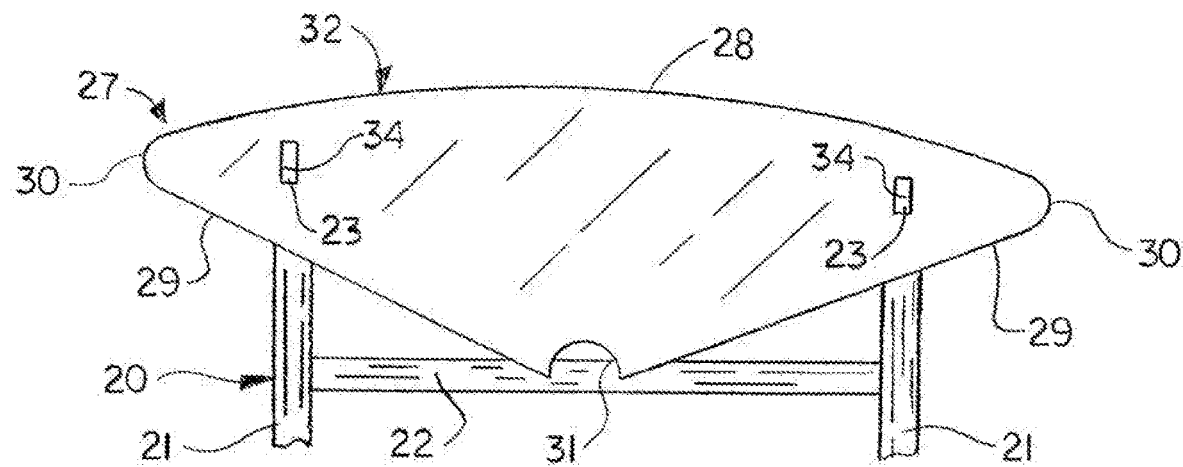
FIG. 7 is a top view of a typical chain support member for the cutting chain of the cutting assembly, mounted on the base frame portion (illustrated in section)

Referring next to FIGS. 1-8 of the drawings, an illustrative embodiment of the vegetation cutting apparatuses is generally indicated by reference numeral 1. The vegetation cutting apparatus 1 may include a wheeled apparatus frame 2. A cutting assembly 26 may be supported by the apparatus frame 2. As illustrated in FIG. 5, the cutting assembly 26 may include an elongated chain support member 27 having a chain support member edge 32 (FIG. 7). A cutting chain 40 may be configured to traverse the chain support member edge 32 of the chain support member 27. An engine 46, which may be gas or electric, may drivingly engage the cutting chain 40. Accordingly, the cutting chain 40 may contact and cut the vegetation 65 as an operator (not illustrated) pushes the vegetation cutting apparatus 1 into the clearance 70 (FIG. 9) between the obstacles 64.

In some embodiments, the apparatus frame 2 may include a pair of spaced-apart wheels 4. An elongated wheel axle 3 may be supported by and extend between the wheels 4. The wheels 4 may be journaled for rotation on the wheel axle 3 according to the knowledge of those skilled in the art. As illustrated in FIGS. 1, 2 and 4, a pair of spaced-apart side frame members 8 may extend from the wheel axle 3. An apparatus handle 16 may extend between the side frame members 8. Accordingly, as particularly illustrated in FIG. 1, the apparatus frame 2 may be elongated and rectangular. A frame brace 12 may extend between the side frame members 8 between and in parallel, spaced-apart relationship to the apparatus handle 16 and the wheel axle 3.

A base frame portion 20 may extend from the wheeled apparatus frame 2. Accordingly, the chain support member 27 (FIGS. 5 and 7) may be supported by the base frame portion 20. As the wheels 4 rest on the ground 74 (FIG. 9), the apparatus frame 2 may extend upwardly from the base frame portion 20 such that the apparatus handle 16 can be grasped by an operator (not illustrated) as the operator stands on the ground 74 behind the vegetation cutting apparatus 1. As illustrated in FIG. 3, the plane of the apparatus frame 2 may be oriented at an obtuse angle 14 with respect to the plane of the base frame portion 20 and of the chain support member 27. In some embodiments, the apparatus frame 2 may be pivotally attached and mounted for selective angular adjustment with respect to the base frame portion 20 according to the know ledge of those skilled in the art. The apparatus frame 2 may thus be selectively adjustable to a selected obtuse angle 14 with respect to the base frame portion 20. In some embodiments, the apparatus frame 2 may be selectively telescopically or otherwise length-adjustable according to the knowledge of those skilled in the art to facilitate various heights of the apparatus handle 16 above the ground 74 according to the preferences of the operator. In some embodiments, the base frame portion 20 may be selectively height-adjustable with respect to the apparatus frame 2 according to the knowledge of those skilled in the art to selectively vary the height of the cutting assembly 26 above the ground 74.

As illustrated in FIGS. 5 and 7, in some embodiments, the base frame portion 20 may include a pair of parallel, spaced-apart base frame arms 21 which may extend from the wheel axle 3 of the apparatus frame 2. The base frame arms 21 may be welded and/or fastened to the wheel axle 3 using mechanical fasteners or other techniques known by those skilled in the art. A cross frame member 22 may extend between the base frame arms 21. Accordingly, the chain support member 27 may be supported by the base frame arms 21.

As illustrated in FIG. 6, in some embodiments, the base frame portion 20 may include at least one engine support member 24. The engine 46 may be supported by the engine support member 24 according to the knowledge of those skilled in the art. In some embodiments, the engine support member 24 may include at least one structural member, bracket, clamp, mechanical fastener or any combination thereof.

As illustrated in FIGS. 1-4, in some embodiments, a control module 58 may be provided on the apparatus handle 16 or in any other accessible location on the apparatus frame 2. The control module 58 may include a throttle lever 59. The throttle lever 59 may be manually actuated to vary the operational speed of the engine 46 typically in the conventional manner. A control cable 60 may connect the control module 58 to the engine 46. The control cable 60 may be secured to one of the side frame members 8 of the apparatus frame 2 via one or more cable clamps 61. In some embodiments, the control module 58 may include other operational controls including a start button and a start button, for example and without limitation.

As illustrated in FIGS. 5 and 7, in some embodiments, the chain support member 27 may have a leading edge 28. The leading edge 28 may be convex. A pair of curved side edges 30 may extend from the leading edge 28. A pair of trailing edges 29 may extend toward each other from the respective side edges 30. A clutch notch 31 may extend into the chain support member 27 at an apex between the trailing edges 29 for purposes which will be hereinafter described. Accordingly, the cutting chain 40 may extend along the leading edge 28, the trailing edges 29 and the side edges 30 and across the clutch notch 31. The cutting chain 40 may traverse the chain support edge 32 responsive to operation of the engine 46. In some embodiments, the chain support member 27 may include a chain support plate, as illustrated. In other embodiments, the chain support member 27 may include a frame or other structure which is suitable for the purpose of supporting the cutting chain 40.

The chain support member 27 may be attached to the base frame arms 21 of the base frame portion 20 according to any suitable technique which is known by those skilled in the art. In some embodiments, a pair of spaced-apart plate mount openings 34 may extend through the base frame portion 20. A pair of spaced-apart plate mount members 23 may extend from the respective base frame arms 21 of the base frame portion 20. The plate mount members 23 may insert or snap into or may be welded or otherwise secured in the respective plate mount openings 34 to secure the chain support member 27 in place on the base frame arms 21. Additional or alternative techniques known by those skilled in the art, including welding, mechanical fasteners and the like, may be used to attach the chain support member 27 to the base frame arms 21.

Figure 8:
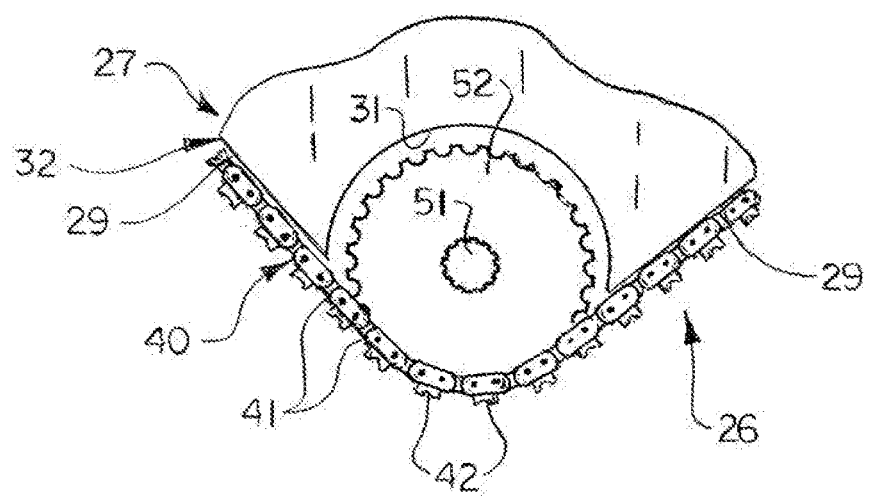
FIG. 8 is an enlarged sectional view of a portion of the chain support member, with the cutting chain on the chain support member, a clutch notch in the chain support member and a chain drive sprocket in the clutch notch and drivingly engaging the cutting chain.

As illustrated in FIGS. 5-8, the engine 46 may drivingly engage the cutting chain 40 for rotation on the chain support member 27 according to the knowledge of those skilled in the art. In some embodiments, the engine 46 may drivingly engage a drive shaft 47. The drive shaft 47 may drivingly engage a driven shaft 51 through a centrifugal clutch 50. As illustrated in FIGS. 5 and 8, the centrifugal clutch 50 may be situated in the clutch notch 31 in the chain support member 27. The driven shall 51 may drivingly engage a drive chain sprocket 52 (FIG. 8). The drive chain sprocket 52 may drivingly engage the cutting chain 40. Accordingly, by operation of the engine 46, the drive chain sprocket 52 may drive the cutting chain 40 around the chain support member edge 32 of the chain support member 27. In other embodiments, the engine 46 may engage the cutting chain 40 through a direct drive configuration, with or without the drive chain sprocket 52.

The cutting chain 40 may have a design which is the same as or similar to that of a conventional chainsaw. Accordingly, as illustrated in FIG. 8, in some embodiments, the cutting chain 40 may include a plurality of chain links 41. At least one cutting blade 42 may extend from each chain link 41. The cutting blades 42 may extend outwardly away from the chain support member edge 32 of the chain support member 27.

Referring next to FIGS. 9-11 of the drawings, in typical application, the vegetation cutting apparatus 1 may be transported to an area in which it is desired to cut vegetation 65 which grows in a narrow clearance 70 between closely-adjacent obstacles 64 such as trees, rocks or poles, for example and without limitation. The vegetation cutting apparatus 1 may be capable of cutting vegetation 65 in any clearance 70 having a width which is narrower than the width of the cutting assembly 26. In some applications, the height or vertical position of the base frame portion 20 and chain support member 27 may be adjusted relative to the apparatus frame 2 depending on the desired cutting height of the cutting chain 40. Other adjustments may be made to the length of the apparatus frame 2 and the obtuse angle 14 (FIG. 3) of the apparatus frame 2 relative to the base frame portion 20 according to the preferences of the operator.

The engine 46 may be operated to drive the cutting chain 40 on the chain support member 27 of the cutting assembly 26. The throttle lever 59 of the control module 58 may be actuated to vary the operational speed of the engine 46. The operator of the vegetation cutting apparatus 1 may grasp the apparatus handle 16 and push the vegetation cutting apparatus 1 toward the clearance 70 as the wheels 4 roll on the ground 74, as illustrated in FIGS. 9 and 10, with the plane of the chain support member 27 and the cutting chain 40 typically parallel to the ground 74. As the operator continues to push the vegetation cutting apparatus 1, the cutting assembly 26 enters the clearance 70 and the cutting chain 40 contacts and cuts the vegetation 65, as illustrated in FIGS. 10 and 11. In some applications, the operator may continue to push the vegetation cutting apparatus 1 until the vegetation cutting apparatus 1 emerges from the clearance 70 and the cutting chain 40 cuts all the vegetation 65 in the clearance 70, forming cut vegetation 68 which is cut at the height of the cutting chain 40 above the ground 74, as illustrated in FIG. 11. In other applications, the operator may pull the apparatus handle 16 to reverse the vegetation cutting apparatus 1 after the cutting assembly 26 cuts all the vegetation 65 in the clearance 70. The vegetation cutting apparatus 1 may then be pushed to another location and other vegetation 65 cut in like manner in another clearance 70.

Figure 13:
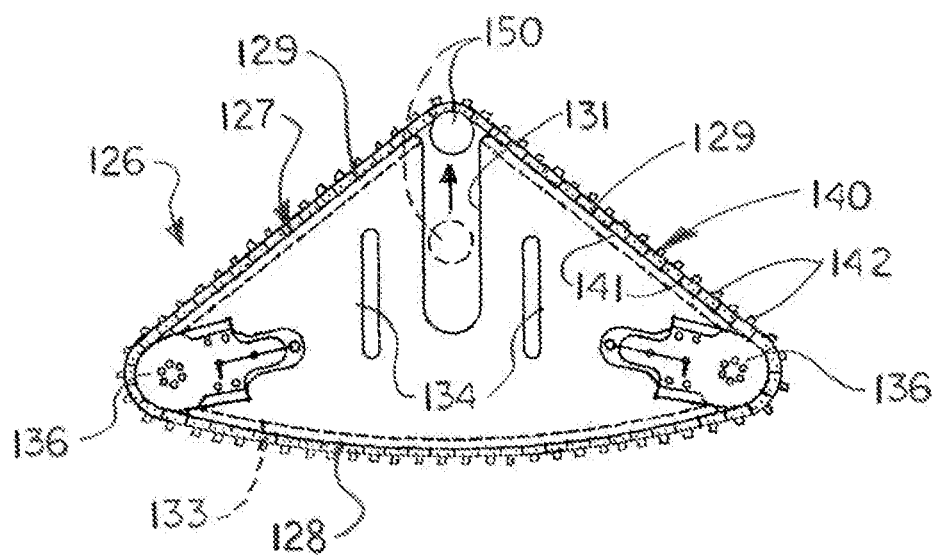
FIG. 13 is a top view of a typical cutting assembly of the illustrative vegetation cutting apparatus illustrated in FIG. 12, more particularly illustrating an elongated clutch slot in the chain support member of the cutting assembly and adjustability of the centrifugal clutch in the clutch slot.
Figure 14:
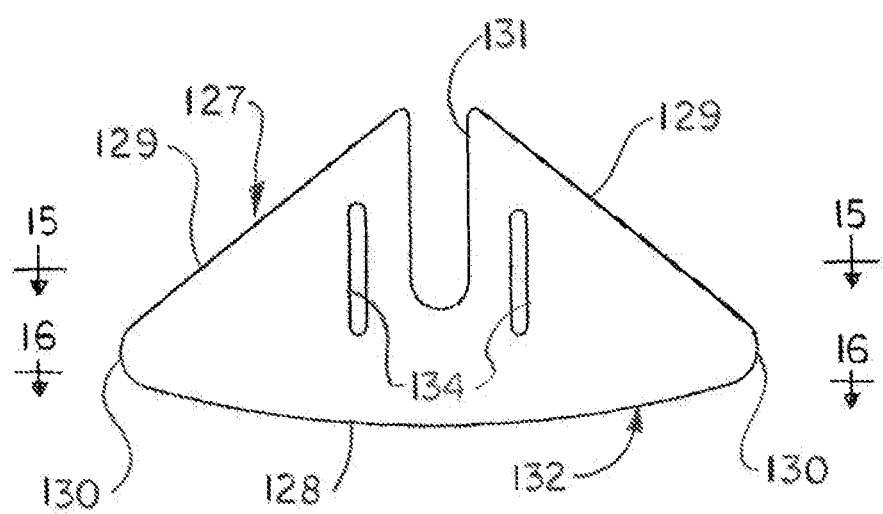
FIG. 14 is a top view of a typical chain support member of the cutting assembly.

Referring next to FIGS. 12-20 of the drawings, an illustrative embodiment of the vegetation cutting apparatuses is generally indicated by reference numeral 101. In the apparatus 101, elements which are analogous to the respective elements of the apparatus 1 that was heretofore described with respect to FIGS. 1-11 are designated by the same respective numerals in the 101-109 series in FIGS. 12-20. As illustrated in FIGS. 13 and 14, the chain support member 127 of the cutting assembly 126 may include an elongated debris removal slot 131. The debris removal slot 131 may extend into the chain support member 127 from the chain support member edge 132. In some embodiments, the debris removal slot 131 may extend from between the trailing edges 129 into the chain support member 127 toward the leading edge 128. The centrifugal clutch 150 or the chain drive sprocket 152 which may be drivingly engaged by the centrifugal clutch 150 in some embodiments may be at least partially disposed in the debris removal slot 131. Accordingly, as illustrated in FIG. 13, the position of the chain support member 127 with respect to the centrifugal clutch 150 may be adjusted to apply a selected degree of tension on the cutting chain 140. This may be carried out typically by loosening the plate mount members 123 in the respective plate mount opening 134, sliding the chain support member 127 forwardly or rearwardly and tightening the plate mount members 123.

Figure 15:
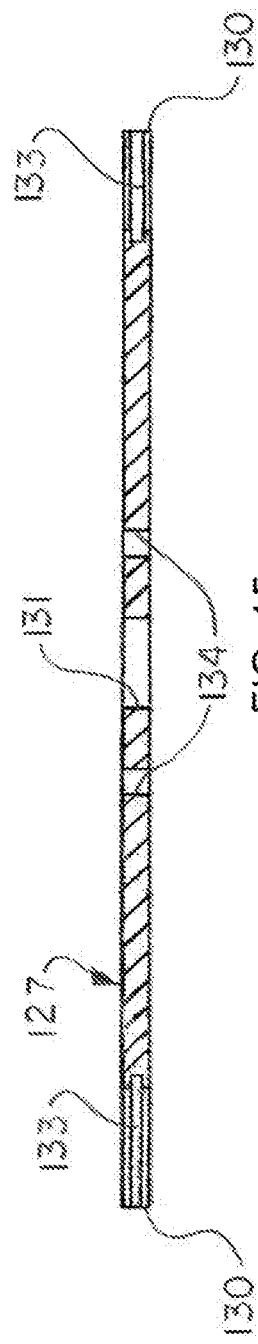
FIG. 15 is a cross-sectional view, taken along section lines 15-15 in FIG. 14, of the chain support member.
Figure 16:
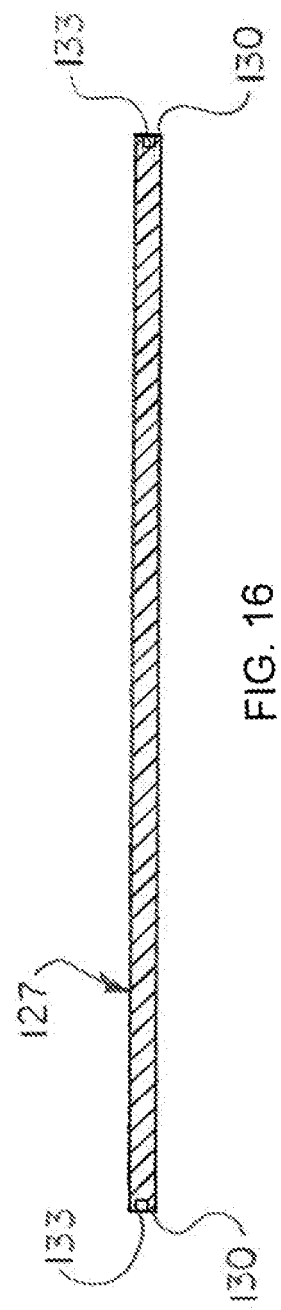
FIG. 16 is a cross-sectional view, taken along section lines 16-16 in FIG. 14, of the chain support member.
Figure 17:
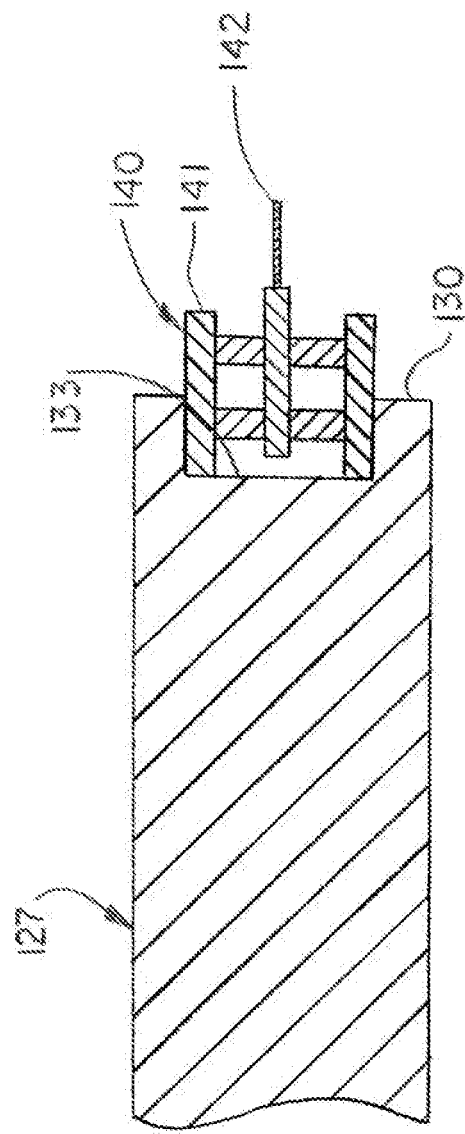
FIG. 17 is an enlarged sectional view of a side edge portion of the chain support member, more particularly illustrating a chain groove in the side edge and a cutting chain disposed in the chain groove.

As illustrated in FIGS. 15-17, in some embodiments, a chain groove 133 may extend into the chain support member edge 132 around the leading edge 128, the trailing edge 129 and the side edges 130. As illustrated in FIG. 17, the cutting chain 140 may situated in the chain groove 133. Accordingly, the chain groove 133 may maintain the cutting chain 140 in place on the chain support member 127 during operation of the vegetation cutting apparatus 101.

Figure 18:
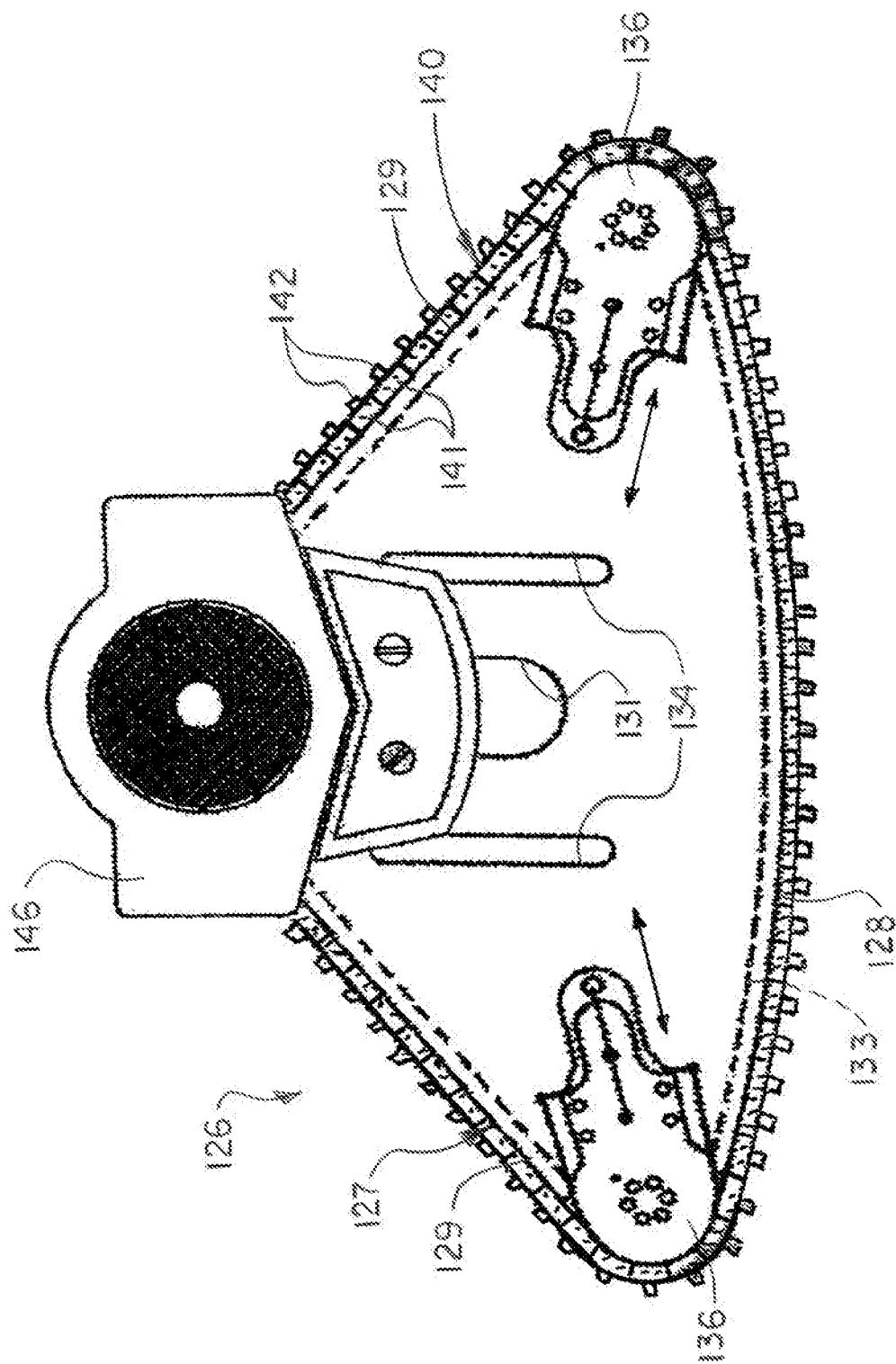
FIG. 18 is a top view of a typical cutting assembly and an engine drivingly engaging the cutting chain of the cutting assembly, more particularly illustrating a pair of chain tensioners on the chain support member and engaging the cutting chain to apply a selected degree of tension to the cutting chain.

As illustrated in FIG. 18, in some embodiments, at least one chain tensioner 136 may be provided on the chain support member 127. The chain tensioner 136 may engage the cutting chain 140 to selectively adjust the tension of the cutting chain 140 on the chain support member 127. In some embodiments, a pair of chain tensioners 136 may be provided on the chain support member 127, as illustrated. The chain tensioners 136 may be positioned at the respective side edges 130 between the leading edge 128 and the respective trailing edges 129 of the chain support member 127.

Figure 19:
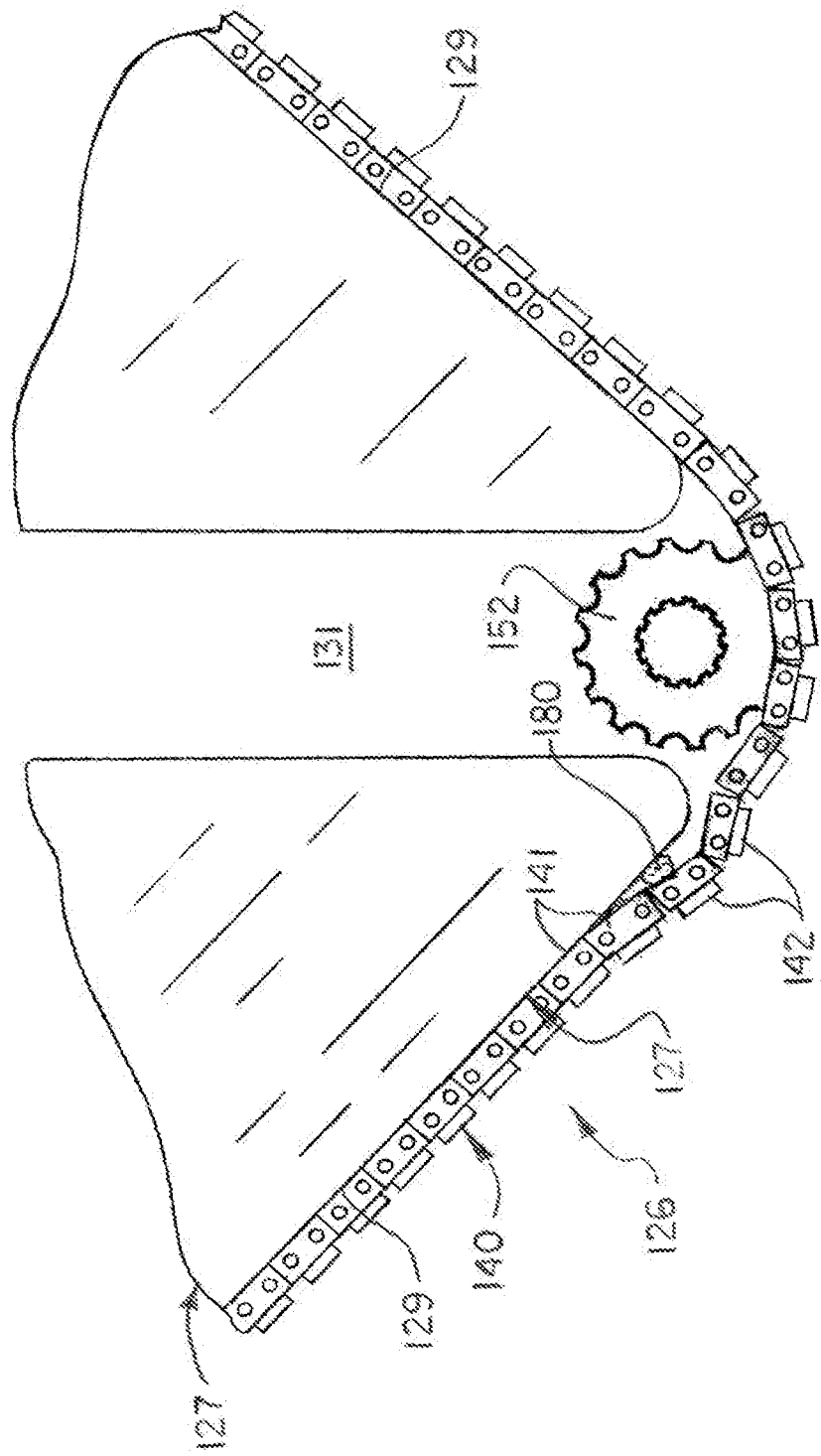
FIG. 19 is a top view of a portion of the cutting assembly, with a piece of debris between the cutting chain and the trailing edge of the chain support member.
Figure 20:
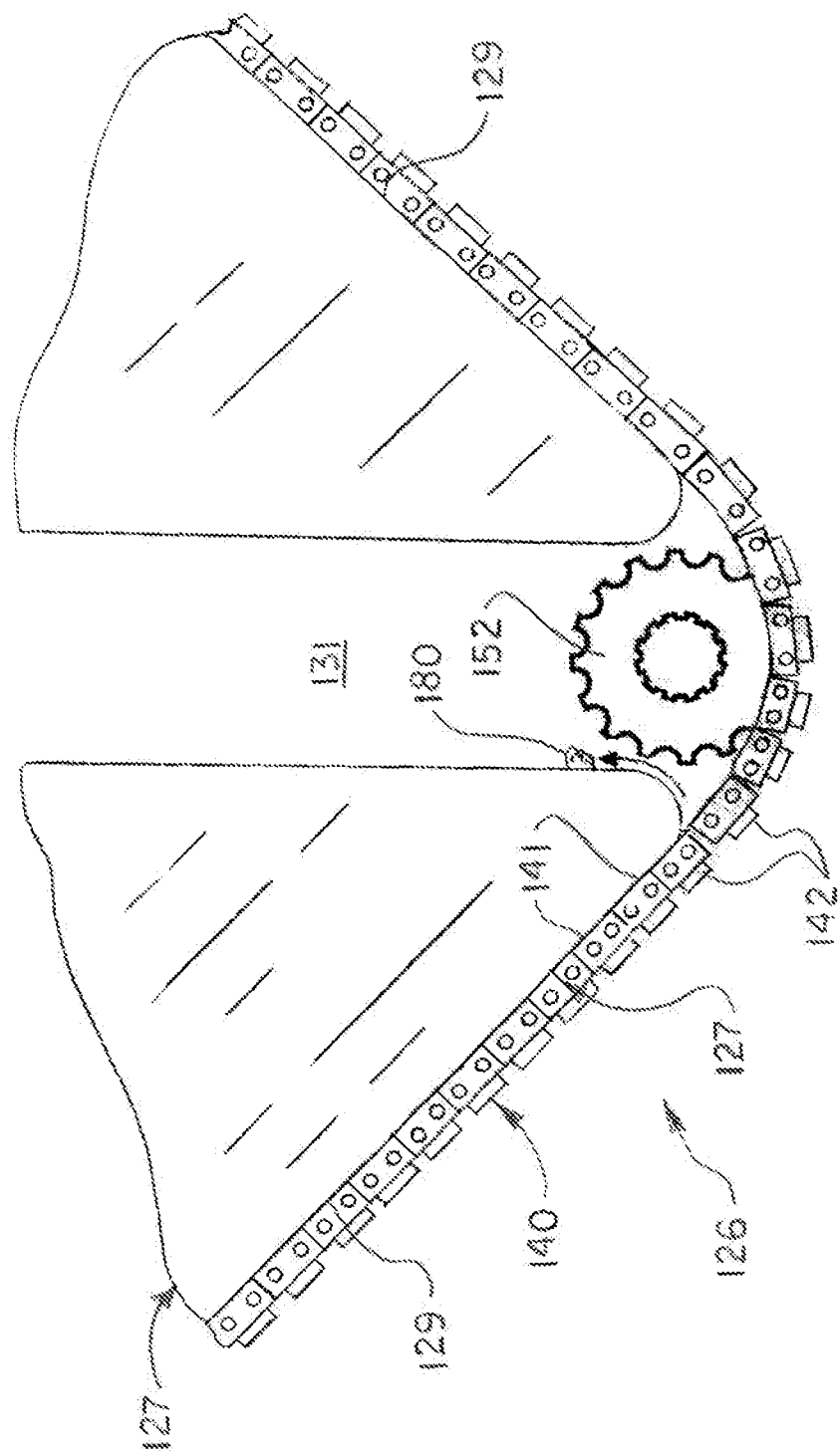
FIG. 20 is a top view of the portion of the cutting assembly illustrated in FIG. 19, more particularly illustrating travel of the debris to the clutch slot in the chain support member for removal of the debris from between the cutting chain and the chain support member.

Operation of the vegetation cutting apparatus 101 may be as was heretofore described with respect to the vegetation cutting apparatus 1 in FIGS. 9-11. As illustrated in FIGS. 19 and 20, in the event that loose debris 180 which is cut from the vegetation 65 (FIG. 10) becomes interposed between the cutting chain 140 and the chain support member 127, the loose debris 180 may travel with the cutting chain 140 along the trailing edge 127 of the chain support member 127 until the loose debris 180 enters the debris removal slot 131. Accordingly, as illustrated in FIG. 20, the loose debris may fall from the debris removal slot 131 onto the underlying ground 74. This expedient may prevent the debris 180 from causing the chain support member 127 to inadvertently come off the chain support member 127.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A vegetation cutting apparatus, comprising:
    a wheeled apparatus frame; and
    a cutting assembly carried by the wheeled apparatus frame, the cutting assembly including:
        an elongated chain support member having a chain support member edge having:
            a leading edge;
            a pair of side edges extending from the leading edge; and
            a pair of side edges extending from the pair of side edges, respectively;
        an elongated debris removal slot extending into the chain support member from between the pair of trailing edges toward the leading edge of the chain support member edge;
        a cutting chain configured to traverse the chain support member edge of the chain support member; and an engine drivingly engaging the cutting chain.

2. The vegetation cutting apparatus of claim 1 further comprising a chain groove in the chain support member edge of the chain support member, and wherein the cutting chain is situated in the chain groove.

3. The vegetation cutting apparatus of claim 1 further comprising a base frame portion carried by the wheeled apparatus frame, and wherein the chain support member is carried by the base frame portion.

4. The vegetation cutting apparatus of claim 3 wherein the base frame portion comprises a pair of spaced-apart base frame arms extending from the wheeled apparatus frame and the chain support member is carried by the pair of spaced-apart base frame arms.

5. The vegetation cutting apparatus of claim 3 wherein the wheeled apparatus frame is oriented at an obtuse angle with respect to the base frame portion.

6. The vegetation cutting apparatus of claim 1 wherein the wheeled apparatus frame comprises a pair of spaced-apart wheels, a wheel axle carried by the pair of spaced-apart wheels, a pair of spaced-apart side frame members extending from the wheel axle and an apparatus handle extending between the pair of spaced-apart side frame members.

7. The vegetation cutting apparatus of claim 6 wherein the wheeled apparatus frame is elongated and rectangular.

8. The vegetation cutting apparatus of claim 1 further comprising at least one chain tensioner on the chain support member and engaging the cutting chain.

9. A vegetation cutting apparatus, comprising:
a wheeled apparatus frame; and
a cutting assembly carried by the wheeled apparatus frame, the cutting assembly including:
an elongated chain support member having a chain support member edge, the chain support member adjustable in position on the apparatus frame, the chain support member edge having:
a leading edge;
a pair of side edges extending from the leading edge; and
a pair of trailing edges extending from the pair of side edges, respectively;
a chain groove in the chain support member edge of the chain support member;
a cutting chain situated in the chain groove, the cutting chain configured to traverse the chain support member edge of the chain support member;
an elongated debris removal slot extending into the chain support member from between the pair of trailing edges toward the leading edge of the chain support member edge;
a centrifugal clutch drivingly engaging the cutting chain, the centrifugal clutch at least partially disposed in the debris removal slot; and
an engine drivingly engaging the centrifugal clutch.

10. The vegetation cutting apparatus of claim 1 further comprising a base frame portion carried by the wheeled apparatus frame, and wherein the chain support member is carried by the base frame portion.

11. The vegetation cutting apparatus of claim 10 wherein the base frame portion comprises a pair of spaced-apart base frame arms extending from the wheeled apparatus frame and the chain support member is carried by the pair of spaced-apart base frame arms.

12. The vegetation cutting apparatus of claim 10 wherein the wheeled apparatus frame is oriented at an obtuse angle with respect to the base frame portion.

13. The vegetation cutting apparatus of claim 9 wherein the wheeled apparatus frame comprises a pair of spaced-apart wheels, a wheel axle carried by the pair of spaced-apart wheels, a pair of spaced-apart side frame members extending from the wheel axle and an apparatus handle extending between the pair of spaced-apart side frame members.

14. The vegetation cutting apparatus of claim 13 wherein the wheeled apparatus frame is elongated and rectangular.

15. The vegetation cutting apparatus of claim 9 wherein the elongated chain support member comprises a chain support plate.

16. The vegetation cutting apparatus of claim 9 further comprising at least one chain tensioner on the chain support member and engaging the cutting chain.

17. A vegetation cutting apparatus, comprising:
a wheeled apparatus frame including:
a pair of spaced-apart wheels;
a wheel axle carried by the pair of spaced-apart wheels;
a pair of spaced-apart side frame members extending from the wheel axle; and
an apparatus handle extending between the pair of spaced-apart side frame members;
a base frame portion extending from the wheeled apparatus frame, the wheeled apparatus frame is oriented at an obtuse angle with respect to the base frame portion; and
a cutting assembly including:
an elongated chain support member carried by the base frame portion, the chain support member having a chain support member edge having:
an elongated, convex leading edge;
a pair of curved side edges extending from the leading edge; and
a pair of trailing edges extending from the pair of curved side edges, respectively;
a chain groove in the chain support member edge of the chain support member;
an elongated debris removal slot extending into the chain support member from between the pair of trailing edges toward the leading edge of the chain support member edge;
a cutting chain situated in the chain groove, the cutting chain configured to traverse the chain support member edge of the chain support member;
a centrifugal clutch drivingly engaged by the engine;
a chain drive sprocket drivingly engaged by the centrifugal clutch and drivingly engaging the cutting chain, the chain drive sprocket at least partially disposed in the debris removal slot;
an engine drivingly engaging the centrifugal clutch; and
a pair of chain tensioners on the chain support member and engaging the cutting chain.

18. The vegetation cutting apparatus of claim 17 wherein the wheeled apparatus frame is elongated and rectangular.

19. The vegetation cutting apparatus of claim 17 wherein the elongated chain support member comprises a chain support plate.

20. The vegetation cutting apparatus of claim 17 wherein the pair of chain tensioners is at the pair of curved side edges, respectively, of the chain support member edge on the chain support member.

* * * * *